(12) United States Patent
Fish

(10) Patent No.: US 8,214,837 B2
(45) Date of Patent: Jul. 3, 2012

(54) METHOD, APPARATUS AND SYSTEM FOR DYNAMICALLY ALLOCATING SEQUESTERED COMPUTING RESOURCES

(75) Inventor: Andrew J. Fish, Olympia, WA (US)

(73) Assignee: Intel Corporation, Santa Clara ( * ) Notice: Subject to any disclaimer, the term of this patent is extended or adjusted under 35 U.S.C. 154(b) by 1646 days.

(21) Appl. No.: 11/003,318

(22) Filed: Dec. 3, 2004

(65) Prior Publication Data

US 2006/0143204 A1 Jun. 29, 2006

(51) Int. Cl.
 *G06F 9/46* (2006.01)
 *G06F 9/455* (2006.01)
(52) U.S. Cl. .............................. 718/104; 718/1; 718/102
(58) Field of Classification Search .............. 718/1–108; 711/100
 See application file for complete search history.

(56) References Cited

U.S. PATENT DOCUMENTS

| | | | |
|---|---|---|---|
| 4,503,501 A | 3/1985 | Coulson et al. | |
| 6,353,844 B1* | 3/2002 | Bitar et al. | 718/102 |
| 6,691,146 B1* | 2/2004 | Armstrong et al. | 718/100 |
| 6,917,999 B2 | 7/2005 | Kumar et al. | |
| 7,051,188 B1* | 5/2006 | Kubala et al. | 712/29 |
| 7,620,953 B1* | 11/2009 | Tene et al. | 718/104 |
| 7,797,756 B2* | 9/2010 | Herington | 726/31 |
| 7,853,952 B2 | 12/2010 | Riddle | |
| 2003/0005200 A1 | 1/2003 | Kumar et al. | |
| 2003/0037092 A1* | 2/2003 | McCarthy et al. | 709/104 |
| 2003/0158884 A1* | 8/2003 | Alford, Jr. | 709/104 |
| 2004/0003063 A1* | 1/2004 | Ashok et al. | 709/221 |
| 2004/0168170 A1* | 8/2004 | Miller | 718/104 |
| 2005/0039183 A1* | 2/2005 | Romero et al. | 718/100 |
| 2005/0120386 A1* | 6/2005 | Stone | 725/134 |
| 2005/0138664 A1* | 6/2005 | Neogi | 725/80 |
| 2005/0240932 A1* | 10/2005 | Billau et al. | 718/104 |
| 2006/0064698 A1* | 3/2006 | Miller et al. | 718/104 |
| 2010/0145668 A1 | 6/2010 | Fisher et al. | |

OTHER PUBLICATIONS

Wikipedia contributors, "Parallel ATA," Wikipedia, The Free Encyclopedia, http://en.wikipedia.org/wiki/Parallel_ATA (accessed Apr. 13, 2011), 14 pages.
Wikipedia contributors, "PC Card," Wikipedia, The Free Encyclopedia, http://en.wikipedia.org/wiki/PC_Card (accessed Apr. 13, 2011), 5 pages.
Wikipedia contributors, "PCI Express," Wikipedia, The Free Encyclopedia, http://en.wikipedia.org/wiki/PCI_Express (accessed Apr. 13, 2011), 14 pages.
Wikipedia contributors, "Plug and play," Wikipedia, The Free Encyclopedia, http://en.wikipedia.org/wiki/Plug_and_play (accessed Apr. 13, 2011). 3 pages.
Wikipedia contributors, "Universal Serial Bus," Wikipedia, The Free Encyclopedia, http://en.wikipedia.org/wiki/USB (accessed Apr. 13, 2011), 29 pages.

* cited by examiner

*Primary Examiner* — Emerson Puente
*Assistant Examiner* — Willy W Huaracha
(74) *Attorney, Agent, or Firm* — Barnes & Thornburg, LLP

(57) ABSTRACT

A method, apparatus, and system enable sequestered partitions on a device. A scheduler may allocate resources to each of the sequestered partitions and dynamically reallocate the resources from one partition to another, as necessary. In one embodiment, the scheduler may dedicate resources to an operating system in a first partition and dedicate resources to a digital video recorder in a second partition. Additionally, the scheduler may reallocate resources to the second partition in response to the resource requirements of the digital video recorder.

16 Claims, 4 Drawing Sheets

METHOD, APPARATUS AND SYSTEM FOR DYNAMICALLY ALLOCATING SEQUESTERED COMPUTING RESOURCES

BACKGROUND

Technological advances have increased computer utilization significantly in recent years. Various techniques have been developed to enable computer users to efficiently and securely utilize their computing devices. For example, as users increasingly perform work related tasks on the same device that they use for personal computing activities, the need to secure each environment on the device becomes increasingly important.

Virtualization is one technique that enables a single host running a virtual machine monitor to present multiple abstractions and/or views of the host, such that the underlying hardware of the host appears as one or more independently operating virtual machines. Each VM may function as a self-contained platform, running its own operating system ("OS"), or a copy of the OS, and/or a software application(s). The VMM manages allocation of resources to the guest software and performs context switching as necessary to cycle between various virtual machines according to a round-robin or other predetermined scheme.

Virtualization thus provides a software-based solution that enables users to isolate various computing environments. As is typical with software-based solutions, however, virtualization adds a degree of complexity and computing requirements to the device, which may burden the device unnecessarily.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for dynamically allocating sequestered computing resources. More specifically, embodiments of the present invention support the creation and maintenance of multiple sequestered partitions on a device. In one embodiment, a primary partition may include an operating system and this partition may serve as the user's primary computer, while the one or more sequestered partitions may serve special purpose needs (e.g., a digital video recording partition with an appropriate "operating system" to serve the partition). Unlike virtualization, embodiments of the present invention may perform all resource sequestering and/or management on the device hardware, thus reducing the degree of complexity on the device as well as increasing the efficiency of the device.

Any reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
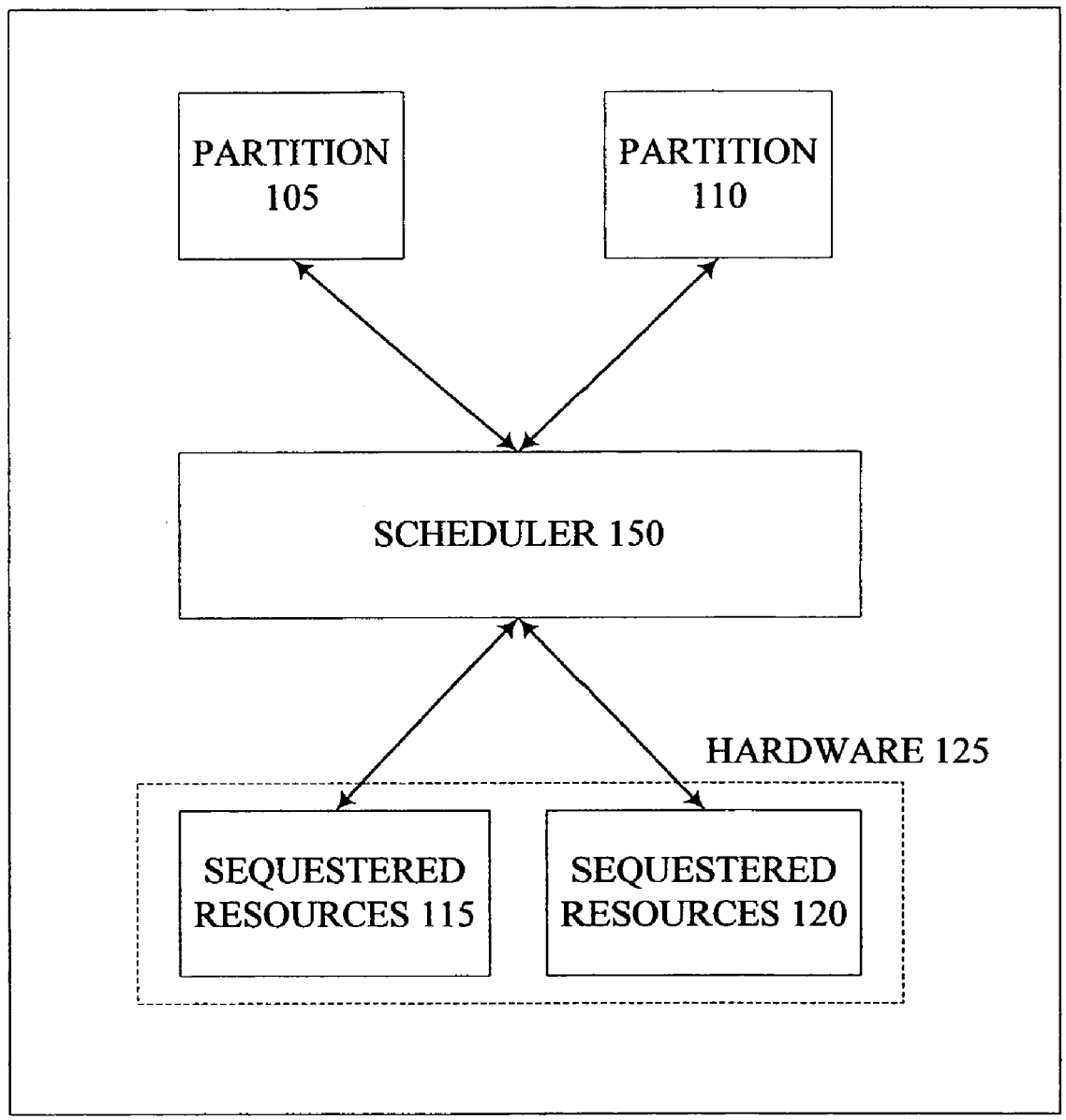
FIG. 1 illustrates a computing device sequestered according to embodiments of the present invention.

FIG. 1 illustrates an embodiment of the present invention. More specifically, FIG. 1 illustrates an example of a computing device according to embodiments of the present invention, having sequestered partitions and resources allocated to each partition. Reference herein to "resources" comprises any and all types of resources typically available on a computing device, including but not limited to all physical resources (processor resources, memory resources, etc.) available to Host 100. For purposes of illustration only two partitions are illustrated, but embodiments of the invention are not so limited. As illustrated, Host 100 may be sequestered into a main partition, i.e., Partition 105 and a sequestered partition, Partition 110. In the following example, Partition 105 is the main partition and Partition 110 is assumed to be dedicated to running a digital video recorder ("DVR"), but embodiments of the present invention are not so limited. In one embodiment of the present invention, a scheduling mechanism ("Scheduler 150") manages the allocation of resources on Host 100. For example, Scheduler 150 may identify and appropriately allocate all the various resources on Host 100 (i.e., Hardware 125) to each of Partition 105 (allocated Sequestered Resources 115) and Partition 110 (allocated Sequestered Resources 120). The resources may remain dedicated to each partition, but in one embodiment, Scheduler 150 may enable the sequestered partition to request and/or otherwise acquire the dedicated resources from the main partition. In other words, embodiments of the present invention enable a host to seamlessly and dynamically reallocate or "hot plug" resources previously dedicated to Partition 105 to Partitions 110, to increase the efficiency of resource utilization on Host 100.

Figure 2:
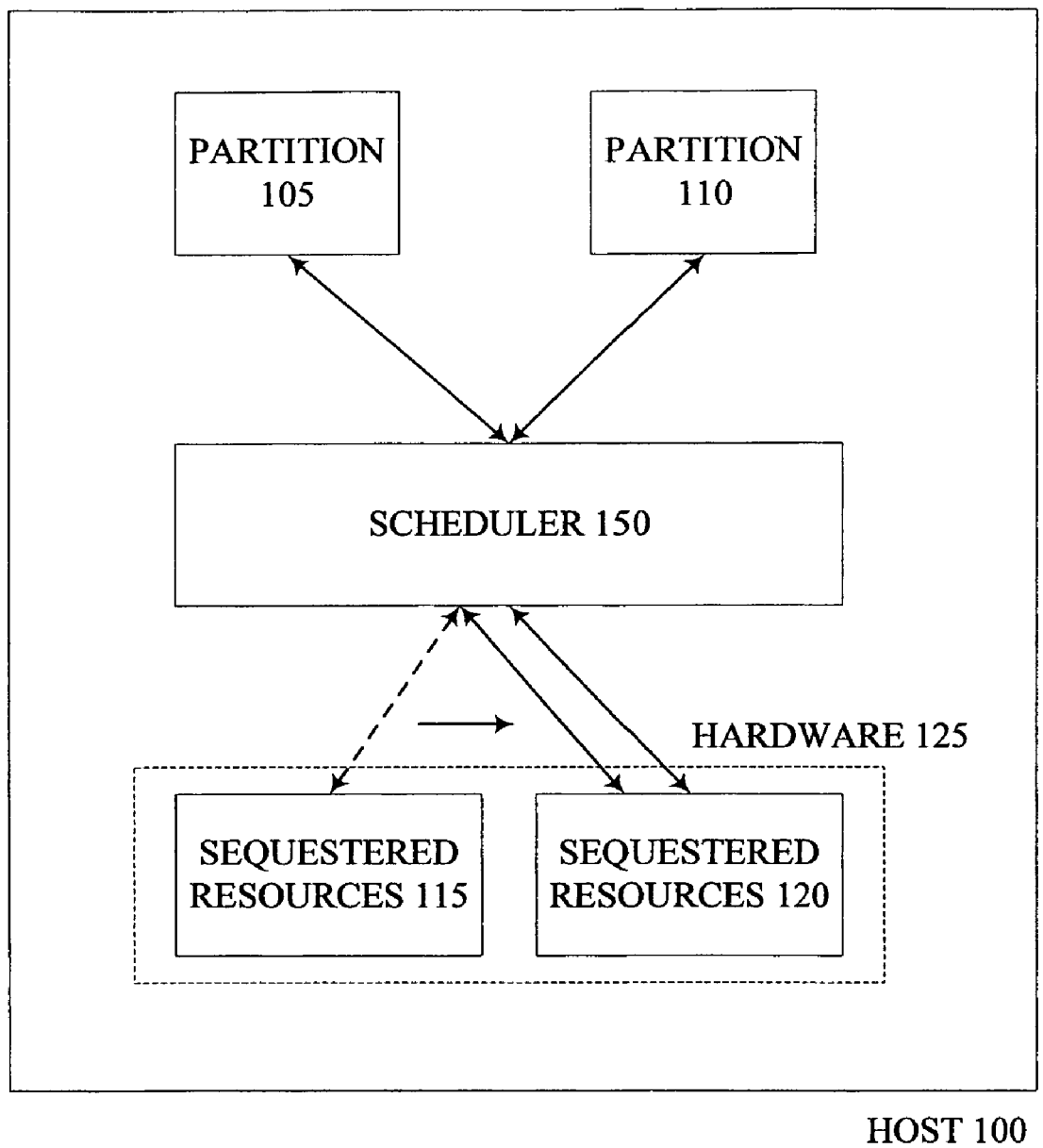
FIG. 2 illustrates an example of one embodiment of the present invention wherein a personal video recorder ("PVR") requests/acquires resources to begin recording.

Thus, for example, as illustrated in FIG. 2, if Partition 110 (comprising a DVR) becomes active (e.g., begins recording), it may require additional resources to adequately perform the resource-intensive recording activity. In one embodiment, Partition 110 may request these additional resources from Partition 105. This request may be routed via Scheduler 150 and/or may be sent directly to Partition 105 (e.g., to the main operating system running in the partition). In an alternate embodiment, Scheduler 150 may independently (based on information retrieved from the operating system running in Partition 105 and/or other such mechanisms) determine that Sequestered Resources 115 (i.e., the resources allocated to Partition 105) are idle and/or underutilized. Scheduler 150 may also determine that since Partition 110 is becoming active, it may benefit from utilizing the idle/unused Sequestered Resources 115. Thus, as illustrated, although Sequestered Resource 115 was initially dedicated to Partition 105, it may be temporarily reallocated to Partition 110.

Figure 3:
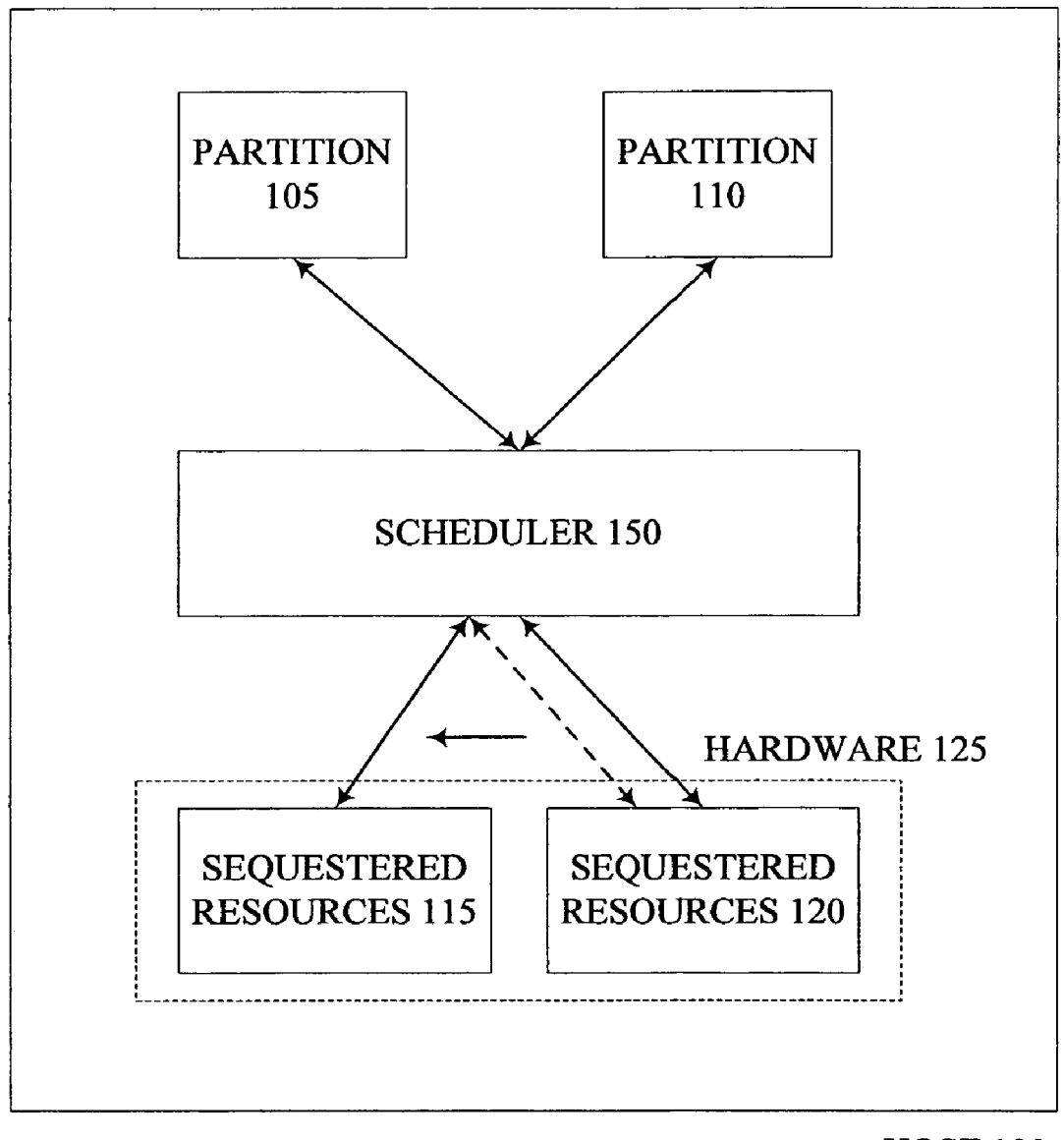
FIG. 3 illustrates an example of one embodiment of the present invention wherein the PVR of FIG. 2 stops recording and releases resources.

Upon completion of its recording activities, however, Partition 110 may no longer require these additional resources. Thus, as illustrated in FIG. 3, in one embodiment, Partition 110 may relinquish the additional resources and revert back to only those resources originally assigned to the sequestered partition. In an alternate embodiment, Scheduler 150 may determine that the resources are no longer required by Partition 110 and/or that Partition 105 requires the resources. The Sequestered Resources 115 may thus become unavailable to Partition 110 and once again be dedicated to Partition 105.

It will be readily apparent to those of ordinary skill in the art that Scheduler 150 may comprise an existing component of Host 100 (e.g., the basic input-output system ("BIOS")) and/or an additional element to the system. Thus, for example, in one embodiment, Scheduler 150 may be implemented in Host 100's BIOS, while in an alternate embodiment, Scheduler 150 may be implemented as an application running within a partition on Host 100 (e.g., main Partition 105). In other words, in various embodiments, Scheduler 150 may be implemented in software (e.g., as a standalone program and/or a component of an operating system), hardware, firmware and/or any combination thereof.

In one embodiment, Host 100 may be configured to support sequestered partitions. Thus, for example, Host 100 may include multiple sets of messaging queues and multiple sets of hardware interfaces for all physical devices coupled to it, thus enabling each partition on the host to "see" only one set of resources. In one embodiment, Partitions 105 and 110 may be defined when Host 100 boots up, while in alternate embodiments, the partitions may be defined dynamically and the resources may be allocated dynamically. Regardless of how the partitions are defined, in one embodiment of the present invention, each partition may run independently of the other. Thus, for example, Partition 110 running the DVR may record even if the operating system in the main partition, Partition 105, is not running.

Figure 4:
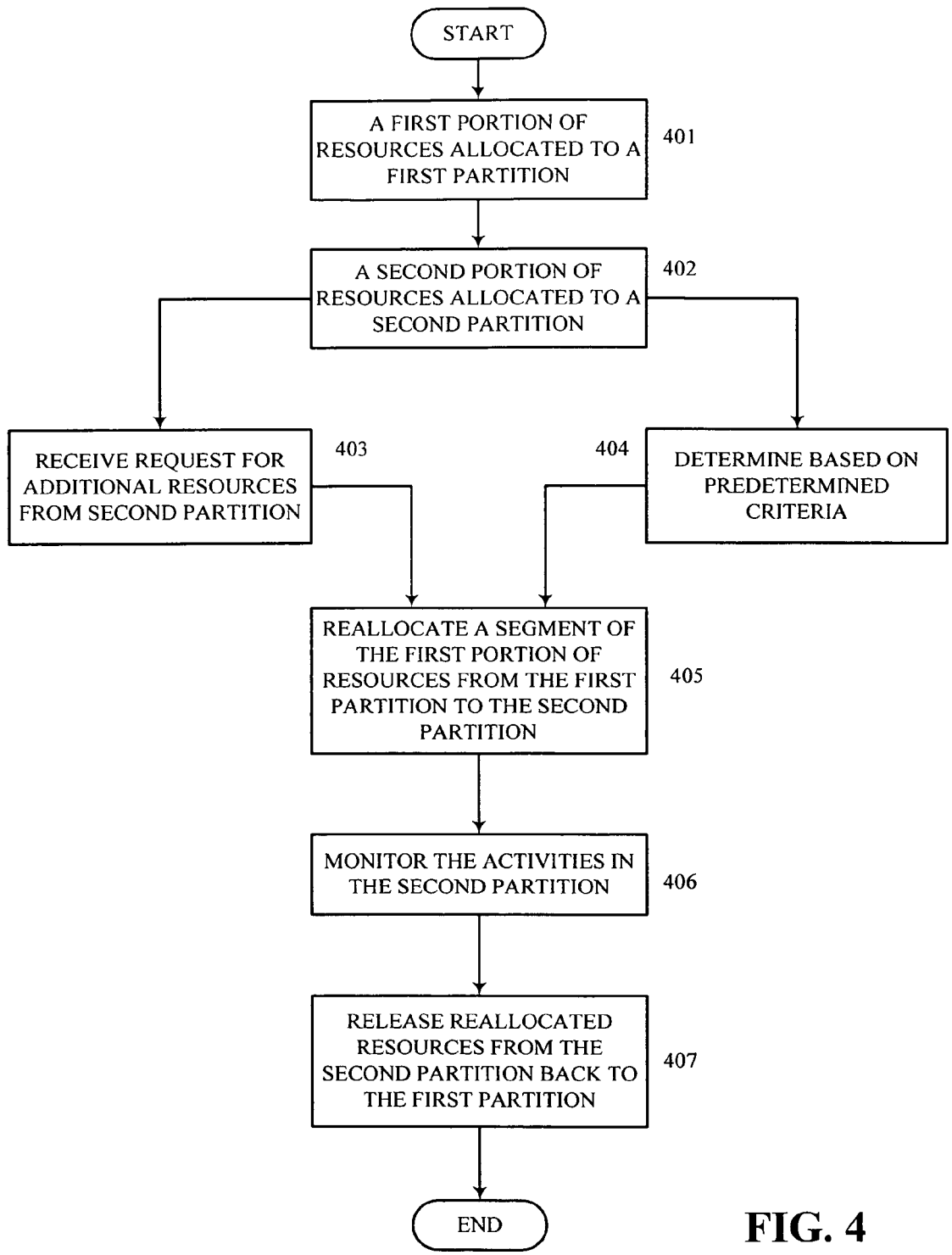
FIG. 4 is a flowchart illustrating an embodiment of the present invention

FIG. 4 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. As illustrated, in 401, a first portion of resources may be assigned to a main partition on a host while in 402, a second portion of resources may be assigned to a second partition. In 403, if a request is received from the second partition, a scheduler may reallocate a segment of the first portion of the resources from the main partition to the second partition in 405. Similarly, in 404, if the scheduler makes a determination based on predetermined criteria that resources should be reallocated, the scheduler may reallocate a segment of the first portion of the resources from the main partition to the second partition in 405. The scheduler may thereafter monitor the activities in second partition in 406 and release the reallocated resources in 407 when the second partition no longer needs the resources. This determination may be made in various ways, e.g., the second partition may inform the scheduler that the reallocated resources are no longer necessary and/or the scheduler may make a determination based on the activity in the second partition that the additional reallocated resources are unnecessary.

Some portions of the detailed descriptions herein may be presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Embodiments of the present invention may be implemented on a variety of computing devices. According to an embodiment of the present invention, computing devices may include various components capable of executing instructions to accomplish an embodiment of the present invention. For example, the computing devices may include and/or be coupled to at least one machine-accessible medium. As used in this specification, a "machine" includes, but is not limited to, any computing device with one or more processors. As used in this specification, a machine-accessible medium may include any mechanism for storing or transmitting information in a form accessible and/or readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory or the like.

According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such current and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A host computing system comprising:
   a main partition including an operating system;
   a second partition including a digital video recorder;
   a plurality of computing system resources accessible by the operating system in the main partition and the digital video recorder in the second partition, the plurality of computing system resources including at least one of processor resources and memory resources; and
   a basic input-output system (BIOS) comprising a scheduler to (i) dedicate a first portion of the plurality of computing system resources to the operating system in the main partition, (ii) dedicate a second portion of the plurality of computing system resources to the digital video recorder in the second partition, (iii) determine initiation of recording by the digital video recorder, (iv) temporarily reallocate at least one segment of the first portion of the plurality of dedicated computing system resources from the operating system in the main partition to the digital video recorder in the second partition, and (v) release the temporarily reallocated computing system resources from the second partition back to the operating system in the main partition in response to the digital video recorder in the second partition no longer needing the temporarily reallocated computing system resources.

2. The host computing system according to claim 1 wherein the scheduler is configured to dynamically reallocate the at least one segment of the first portion of the plurality of dedicated computing system resources in response to a request from the digital video recorder.

3. The host computing system according to claim 1 wherein the scheduler is configured dynamically reallocate the at least one segment of the first portion of the plurality of dedicated computing system resources as determined by predetermined criteria.

4. The host computing system according to claim 1, wherein the second partition to inform the scheduler that the temporarily reallocated resources from the main partition are no longer needed.

5. A method for dynamically allocating resources, comprising:
   allocating a first portion of a plurality of resources to a main partition on a host, wherein the main partition includes a host operating system and the first portion of the plurality of resources allocated to the main partition on the host remain dedicated to the main partition;
   allocating a second portion of a plurality of resources to a second partition on the host, wherein the second partition includes a digital video recorder and the second portion of the plurality of resources allocated to the second partition on the host remain dedicated to the second partition;
   initiating the digital video recorder in the second partition;
   initiating recording by the digital video recorder;
   determining that additional resources are needed in response to initiation of recording by the digital video recorder;
   sending a request for the additional resources directly from the second partition to the host operating system of the main partition in response to determining that additional resources are needed; and
   temporarily reallocating at least one segment of the first portion of the plurality of resources from the main partition to the second partition in response to the request.

6. The method according to claim 5, further comprising dynamically reallocating the at least one segment of the first portion of the plurality of resources based on predetermined criteria.

7. The method according to claim 5 wherein the plurality of resources includes at least one of processor resources and memory resources.

8. The method according to claim 5, wherein sending the request for additional resources directly from the second partition to the host operating system includes sending the request directly from the digital video recorder.

9. The method according to claim 5, further comprising:
   relinquishing the temporarily reallocated at least one segment of the first portion of the plurality of resources by the second partition in response to the second partition no longer needing the temporarily reallocated resources; and
   returning the relinquished temporarily reallocated resources back to the first partition.

10. A non-transitory machine-accessible medium having stored thereon instructions that, when executed by a machine, cause the machine to dynamically allocate resources by:
   sequestering a first portion of a plurality of resources to a main partition on a host, wherein the main partition includes an inactive host operating system and the first portion of the plurality of resources sequestered to the main partition on the host remain dedicated to the main partition;
   sequestering a second portion of a plurality of resources to a second partition on the host, wherein the second partition includes a digital video recorder and the second portion of the plurality of resources sequestered to the second partition on the host remain dedicated to the second partition;
   determining initiation of recording by the digital video recorder;
   temporarily reallocating at least one segment of the first portion of the plurality of resources from the main partition to the second partition in response to initiation of recording by the digital video recorder;
   determining, with the second partition, that the temporarily reallocated resources are no longer needed by the second partition based on cessation of recording by the digital video recorder; and
   releasing the temporarily reallocated resources from the second partition back to the inactive host operating system in the main partition in response to determining that the temporality reallocated resources are no longer needed by the second partition.

11. The machine-accessible medium according to claim 10 wherein the instructions, when executed by the machine, further cause the machine to dynamically reallocate the at least one segment of the first portion of the plurality of resources occurs in response to a request from the digital video recorder.

12. The machine-accessible medium according to claim 10 wherein the instructions, when executed by the machine, further cause the machine to dynamically reallocate the at least one segment of the first portion of the plurality of resources occurs as determined by predetermined criteria.

13. The machine-accessible medium according to claim 10 wherein the plurality of resources includes at least one of processor resources and memory resources.

14. A method for dynamically allocating resources, comprising:

sequestering a first portion of resources for a main partition on a computing device, wherein the first portion of resources sequestered to the main partition on the computing device remain dedicated to the main partition;

sequestering a second portion of resources for a special purpose partition on a computer device, wherein the special purpose partition to serve a special need and the second portion of resources sequestered to the special purpose partition on the computing device remain dedicated to the special purpose partition;

sending a request for additional resources from the special purpose partition to the main partition, wherein the request is sent directly from the special purpose partition to the main partition without passing through a scheduler;

dynamically reallocating a segment of the first portion of resources from the main partition to the special purpose partition in response to the main partition receiving a request for additional resources from the special purpose partition;

determining, with the special purpose partition, that the reallocated resources are no longer needed by the special purpose partition; and dynamically releasing the reallocated resources from the special purpose partition back to the main partition in response to the special purpose partition no longer needing the reallocated resources.

15. The method according to claim 14 wherein dynamically reallocating a segment of the first portion of resources from the main partition to the special purpose partition occurs in response to a decision by a scheduling module based on the activities occurring in the special purpose partition.

16. The method according to claim 14 further comprising monitoring the second partition to determine when to release the segment of the first portion of resources back to the main partition.

* * * * *